July 10, 1962   V. J. STEPHENSON   3,043,402
EMERGENCY BRAKING SYSTEM
Filed July 10, 1959   3 Sheets-Sheet 1

INVENTOR.
VERL J. STEPHENSON
BY
Thomas P. Mahoney
ATTORNEY

July 10, 1962 V. J. STEPHENSON 3,043,402
EMERGENCY BRAKING SYSTEM
Filed July 10, 1959 3 Sheets-Sheet 2
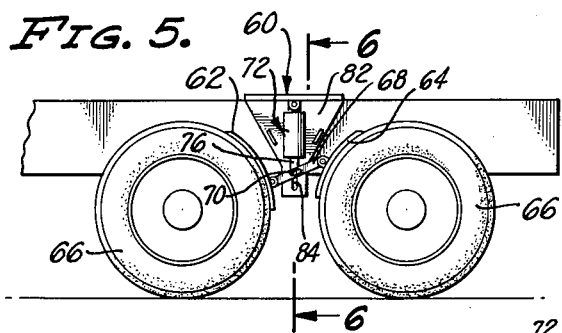
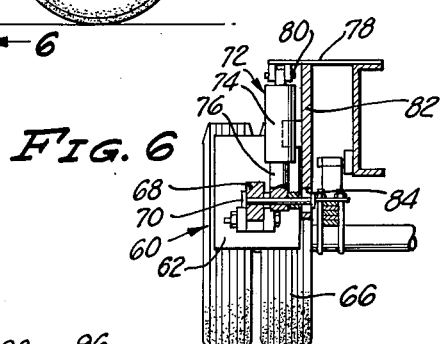
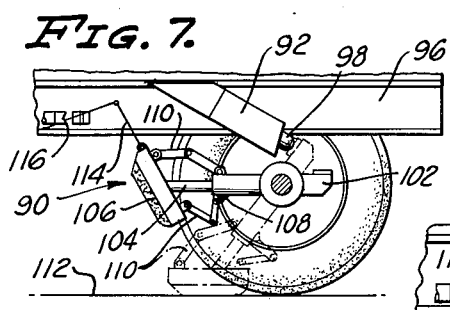
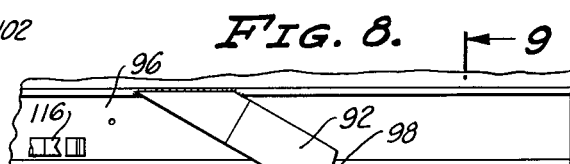
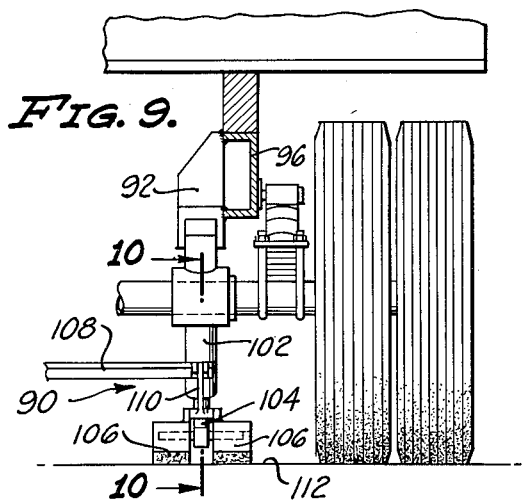
INVENTOR.
VERL J. STEPHENSON
BY
Thomas F. Mahoney
ATTORNEY.

July 10, 1962 V. J. STEPHENSON 3,043,402
EMERGENCY BRAKING SYSTEM
Filed July 10, 1959 3 Sheets-Sheet 3
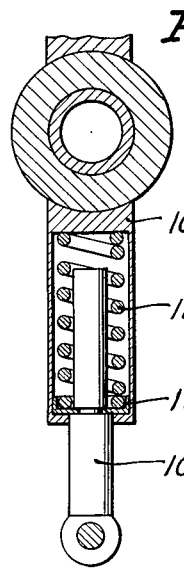
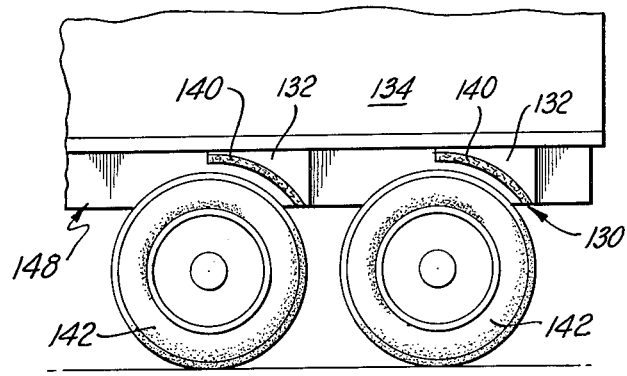
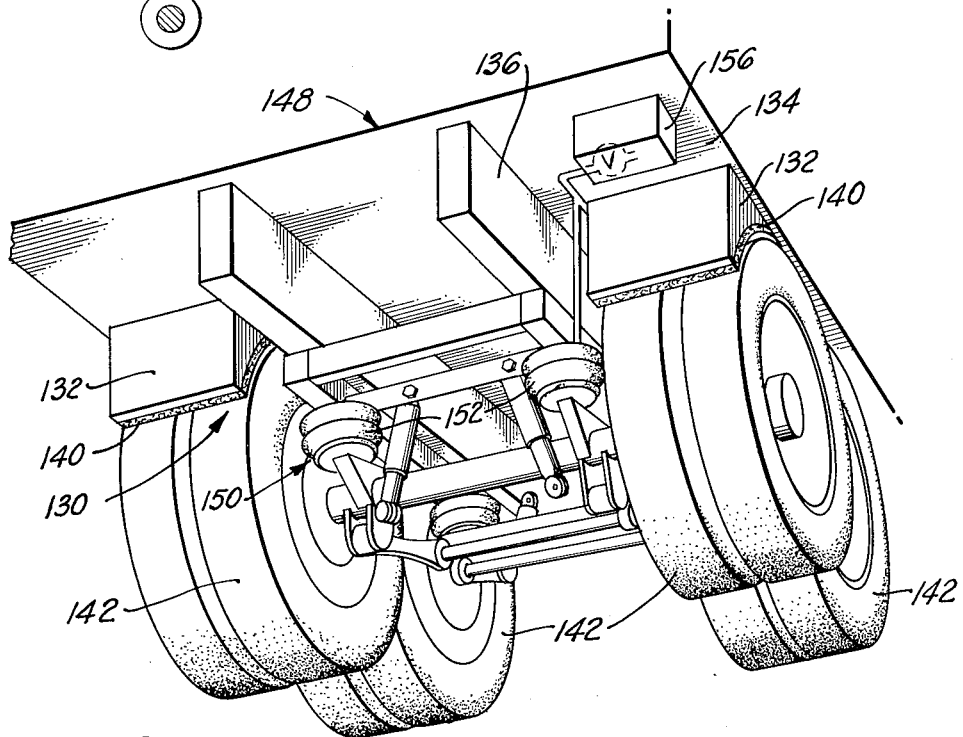
INVENTOR.
VERL J. STEPHENSON
BY
Thomas P. Mahoney
ATTORNEY

United States Patent Office 3,043,402
Patented July 10, 1962

3,043,402
EMERGENCY BRAKING SYSTEM
Verl J. Stephenson, 2065 Verdugo Blvd., Montrose, Calif., assignor of one-half to John F. Ochsner, Los Angeles, Calif.
Filed July 10, 1959, Ser. No. 826,157
3 Claims. (Cl. 188—29)

This invention relates to an emergency braking system for large vehicles such as trucks and the like, and is characterized both by its ease of installation and its efficiency of operation.

In recent years the size of trucks, busses and similar automotive vehicles has become so great that, when these vehicles encounter steep downward grades, severe loads are imposed upon both the normal braking systems of the vehicles and the transmissions thereof. It is well known that conventional brakes, wherein the braking is accomplished by the application of a brake shoe to a brake drum connected to a wheel, are subject to overheating and failure when excessive application of the brakes is necessary due to the traversing of a long and steep grade by the vehicle in which the brakes are installed.

When subjected to prolonged overheating, conventional brakes will burn out and under such conditions the transmission of the vehicle will fail and the vehicle runs away with consequent loss of life and extensive destruction of property. This problem has become more acute as the number of heavy commercial vehicles on the road increases and as the proportionate effectiveness of the conventional braking systems to the over-all weight of the vehicles in which they are installed becomes substantially diminished.

Many attempts have been made in the past to provide some type of emergency brake means for utilization in conjunction with the conventional braking system of a commercial vehicle in order that, should the regular braking system fail, the emergency braking system can be applied. However, such emergency braking systems have had inherent disadvantages, among them being the fact that road engaging devices were utilized, which are prohibited in many states, or the action of the emergency brakes was such that the end result of the application of the emergency brakes was as disastrous as the results consequent upon the complete failure of the normal braking system.

It is, therefore, an object of my invention to provide an emergency braking system for heavy vehicles, such as trucks or the like, which includes emergency brakes and means for gradually applying the emergency brakes to the perimeters of the tires on the wheels of the vehicles when release means maintaining the emergency brakes inoperative is actuated to permit the emergency brakes to move into operative positions.

In order to prevent the skidding or other malfunctioning of the run-away vehicle I have provided, in conjunction with the emergency brakes incorporated in the system of my invention, means for retarding the progressive engagement of the emergency brakes with the tires of the vehicle in order that the braking action of the emergency brakes may be progressive and gradual, thus eliminating unduly rapid deceleration and excessive strain upon the braking mechanism and the suspensory system of the vehicle in which the emergency braking system of my invention is incorporated.

Other objects and advantages of my invention will be apparent from the following specification and the accompanying drawings, which are for the purpose of illustration only and in which:

FIG. 5 is a side elevational view of an alternative form of the braking system of my invention;

FIG. 6 is a transverse, sectional view taken on the broken line 6—6 of FIG. 5;

FIG. 7 is a fragmentary view showing another alternative form of the emergency braking system of my invention;

FIG. 8 is an enlarged view similar to FIG. 7;

FIG. 9 is a transverse, sectional view taken on the broken line 9—9 of FIG. 8;

FIG. 10 is a vertical sectional view taken on the broken line 10—10 of FIG. 9;

FIG. 11 is a fragmentary, side elevational view showing an alternative embodiment of the braking system of my invention; and FIG. 12 is a perspective view illustrating the braking system of FIG. 11.

Figure 1:
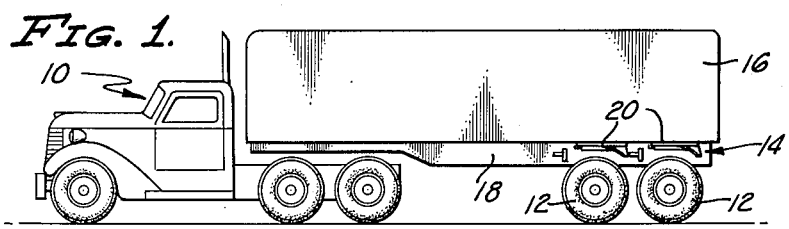
FIG. 1 is a side elevational view of a vehicle incorporating an emergency brake system constructed in accordance with the teachings of my invention.

Referring to the drawings and particularly to FIGS. 1–4 thereof, I show a tractor-trailer combination 10, the wheels 12 of said trailer being equipped with rubber tires and having an emergency brake system 14 constructed in accordance with the teachings of my invention associated therewith. The trailer includes an enclosed body 16 mounted on an elongated frame or chassis 18 and the various components of the emergency braking system 14 of my invention are securable either to the body 16 or to the frame 18 of the trailer.

Figure 4:
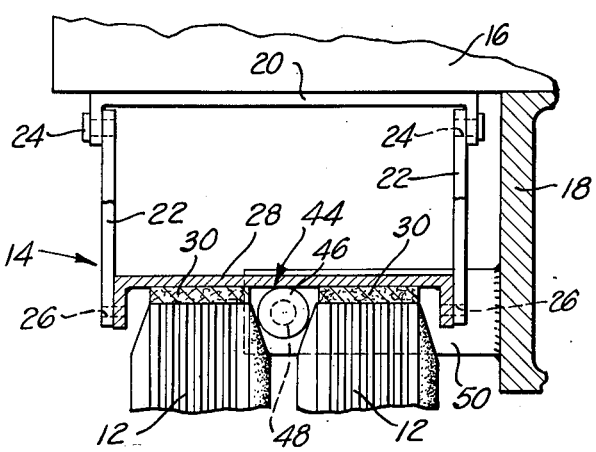
FIG. 4 is a transverse, sectional view taken on the broken line 4—4 of FIG. 3.
Figure 2A:
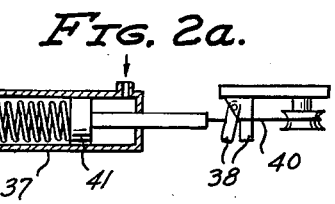
FIG. 2a is an enlarged, fragmentary, top plan view showing the actuating means for the brake shoes of the embodiment of the invention shown in FIG. 2.

The emergency braking system 14 includes an elongated mounting bracket 20 which is secured to the underside of the structure of the body 16 and said bracket has a plurality of parallel mounting arms 22 pivotally fastened thereupon by means of pivot pins 24. In the installation under consideration here, the emergency braking system includes four mounting brackets 20, two of which are located on one side of the trailer and two of which are located on the opposite side of the trailer in juxtaposition to the respective wheels 12. Pivotally secured to the lower extremities of the mounting arms 22, as best shown in FIG. 4 of the drawings, by means of pivot pins 26, is a brake shoe carrier 28 which is adapted to support a pair of brake shoes 30 on its undersurface and which is adapted, when retracted into the inoperative position shown in FIGS. 1 and 2 of the drawings, to rest within the mounting bracket 20. The brake shoes 30 may be fabricated from conventional fibrous brake material and secured to the undersurface of the carrier by adhesive or other means.

Figures 2, 4A:
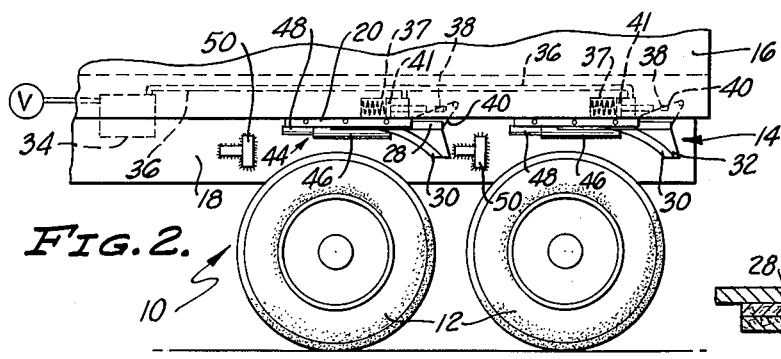
FIG. 2 is an enlarged, fragmentary view showing the emergency braking system of FIG. 1 with the emergency brakes of the system disposed in their inoperative positions.
FIG. 4a is a transverse, sectional view showing the utilization of two layers of material on a brake shoe.

The brake shoes 30 extend, as best shown in FIG. 2 of the drawings, downwardly and rearwardly to engage upon the adjacent tire of a respective wheel 12 when the carrier 28 moves into contiguity to the perimeter of said tire and the depending portions of the brake shoes are supported by an auxiliary mounting block 32 which is fastened to the rearward extremity of the carrier. It is obvious that the carrier 28 may be maintained in its inoperative position, as best shown in FIGS. 1 and 2 of the drawings, by any one of a different number of retention and releasing devices, but I provide an auxiliary air reservoir, shown schematically at 34 in FIGS. 2 and 3 of the drawings, said air reservoir being connected to the regular air brake supply and being connected through a line 36 to air cylinders 37, adapted to energize cutting knives 38 which engage suspensory wires 40 secured to the rearward extremities of the respective carriers 28.

Therefore, should the air supply to the auxiliary reservoir 34 fail, indicating a corresponding failure of air supply to the regular braking system of the tractor-trailer combination 10, spring biased pistons 41 in the air cylinders 37 which are maintained inoperative by the air pressure, will be urged by associated compression springs to cause the cutting knives 38 to sever the suspensory wires 40 simultaneously and thus simultaneously permit the four sets of emergency brakes 30 to be lowered by gravity into the operative positions thereof wherein the perimeters of the tires of the wheels 12 are engaged.

Figure 3:
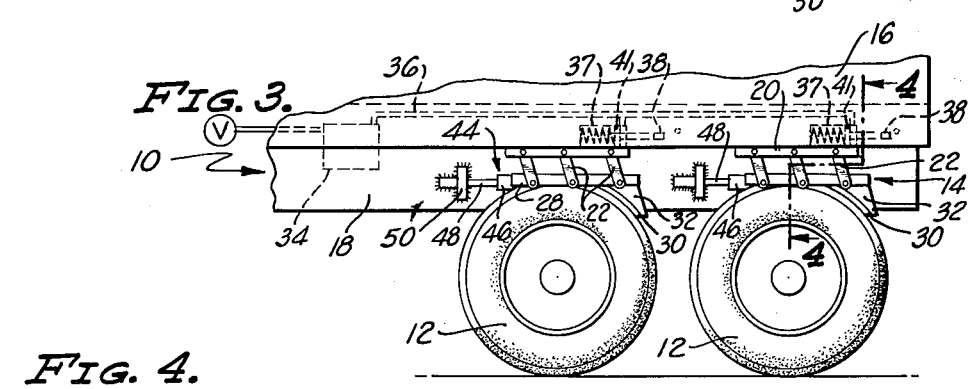
FIG. 3 is a view similar to FIG. 2 showing the emergency brakes of the system applied to the perimeters of the tires of the vehicle.

In addition to the automatically energizable retention and release system described hereinabove, voluntary energization of the retention and release system for the emergency brakes 30 may be provided so that, by the energization of a valve, shown in FIGS. 2 and 3 of the drawings, the air pressure in the reservoir 34 may be dumped and the brakes 30 urged by gravity into contiguity with the tires of the wheels 12.

Mounted upon each of the carriers 28 is a retarding means 44 constituted by a cylinder 46 having a piston rod 48 protruding from the forward extremity thereof. The cylinder 46 is filled with a suitable lubricant which can bypass the piston, not shown, to which the piston rod 48 is affixed, thus permitting the carrier 28 and the emergency brakes 30 mounted thereupon to gradually engage the perimeter of an associated tire.

Mounted upon the side of the frame 18 in juxtaposition to an associated wheel 12 is an abutment plate 50 whose inner extremity is secured to the frame 18, as by welding or the like. Therefore, when the suspensory wires 40 are cut by the action of the cutting knives 38 and the brakes 30 engage the perimeters of the tires of the wheels 12, the outer extremities of the piston rods 48 will engage the plates 50 to cause the brakes 30 to gradually engage the perimeters of the tires of the respective wheels 12. As the brakes 30 engage the perimeters of the tires, the torque of the wheels serves as an actuating force and, since the brakes 30 are urged downwardly by gravity, the failure of the pneumatic braking system or other auxiliary sources of power cannot affect the instantaneous operation of the emergency brake system 14 of my invention.

As the brakes 30 are engaged upon the tires of the wheels 12, the carriers 28 mounting the same are pivoted forwardly and the piston rods 48 are urged in to the respective cylinders 46 by their impingement on the abutment plates 50. In addition, as the carriers 28 move forwardly, the effective lengths of the suspensory arms 22 increase to wedge the brakes 30 more securely against the perimeters of the tires of the wheels 12, thus progressively imposing a greater proportion of the weight of the trailer upon the tires and ultimately bringing the vehicle to a stop.

By the provision of the retarding means 44 constituted by the cylinder 46 and piston rod 48 instantaneous and excessively rapid engagement of the brakes 30 upon the tires 12 is prevented and the tires 12 are thus gradually subjected to the braking load in a progressive manner closely simulating the effective braking action of the normal brake system of the vehicle. In addition, the extremely large braking areas provided by the cooperative relationship between the brakes 30 and the perimeters of the tires 12, enables the emergency braking system 14 of my invention to be effectively utilized when the vehicle in which the system is incorporated has already begun to run away and would not respond to the application of conventional braking pressures.

An alternative embodiment 60 of the emergency brake of my invention is shown in FIGS. 5 and 6 of the drawings as including a pair of emergency brake shoes 62 and 64 mounted between the tires of wheels 66 on a common supporting arm 68. The shoes 62 and 64 are pivotally connected to the opposite extremities of the arm 68 and the arm 68, in turn, is pivotally secured by means of a pivot pin 70 to the lower extremity of retarding means 72 constituted by a cylinder 74 and piston rod 76. The upper extremity of the cylinder is pivotally mounted on a mounting bracket 78 by means of a pivot pin 80 and a guide plate 82 is juxtaposed to the cylinder 74 and incorporates a slot 84 in which the pivot pin 70 travels, as best shown in FIG. 6 of the drawings.

Of course, one set of emergency brakes 62 and 64 is located on each of the side of the associated vehicle and a combined retention and releasing means similar to that disclosed in the previously discussed emergency brake system 14 is utilized in conjunction with the brakes 62 and 64 of the braking system 60 to maintain the brakes 62 and 64 out of operative engagement with the perimeters of the tires of the wheels 66. However, when the retention means, not shown, is released to permit the brakes 62 and 64 to engage the perimeters of the tires on the wheels 66, the retarding means 72 will slowly permit the brakes 62 and 64 to be urged into contiguity and engagement with the perimeters of said tires. If desired, the coefficient of friction of the brake 64 can be less than that of the brake 62 in order that the somewhat greater torque imposed thereupon because of the position thereof will be balanced out on the lead wheel. As the brakes 62 and 64 are permitted to descend into closer engagement with the perimeters of the tires on the wheels 66, the wheels 66 will be gradually brought to a stop.

A characteristic common to both the presently discussed embodiment 60 of the invention and the previously discussed emergency braking system 14 is that no ground engaging means are utilized and thus the embodiment 60 of the braking system can be used in states where ground engaging means are forbidden. Furthermore, the incorporation in both systems of the retarding means prevents the imposition of sudden loads which might cause skidding or swerving of the vehicle and result in accidents as great as that which the emergency braking system is intended to forestall.

An alternative embodiment 90 of the emergency braking system of my invention is shown in FIGS. 7–10 and is intended for utilization in states where the use of ground engaging brake shoes is permissible. The emergency braking system 90 of the invention includes a retarding cylinder 92 mounted on the frame 96 of the vehicle with which the system 90 is associated. The cylinder has a piston rod 98 projecting therefrom into engagement with the upper extremity of another cylinder 102 which has a piston rod 104 projecting from the lower extremity thereof and pivotally supporting a pair of brake shoes 106 thereupon. A tie bar 108 connects the cylinder 102 with a corresponding cylinder on the opposite side of the vehicle. Parallel linkages 110 orient the shoes 106 into parallelism with the adjacent road surface 112.

The emergency brake shoes 106 are normally suspended in inoperative position, shown in FIG. 7 of the drawings, by means of a suspensory cable 114, which is adapted to be severed by a cutter blade 116 energizable in a manner similar to the manner in which the cutting knives 38 are energized to cut the suspensory wires 40 to release the emergency brakes 30 of the previously discussed embodiment of the invention. Therefore, when the suspensory cable 114 is severed by energization, either automatic or voluntary, of the cutter blade 116, the shoes 106 will drop into engagement with the adjacent road surface 112, causing the upper extremity of the cylinder 102 to be engaged by the piston rod 98. Thus, the application of the shoes 106 will take place gradually and prevent an excessively sudden braking action from taking place.

The cylinder 102 is shown in cross section in FIG. 10 of the drawings as including a compression spring 120 and a piston 122 mounted upon the piston rod 104. Since the brake shoes 106 are secured to the lower extremity of the piston rod 104, the piston rod 104 will be gradually urged inwardly against the bias of the spring 120 as the brake shoes engage the road surface 112. In addition, a supply of lubricant is disposed in the cylinder 102 and gradually bypasses the piston 122 to further dampen inward movement of the piston rod 104.

An alternative embodiment 130 of the emergency brake system of my invention is shown in FIGS. 11 and 12 of the drawings as constituted by a plurality of mounting blocks 132 secured either to the body 134 or the frame 136 of the associated vehicle. Fixedly attached to the undersurfaces of the mounting blocks 132 are emergency brake shoes 140, said brake shoes being appropriately contoured to engage the perimeters of the tires on the wheels 142. The vehicle 148 in which the brake system 130 is installed includes an air suspension system 150 constituted by a plurality of pneumatically inflatable bellows 152 which are adapted to be expanded or retracted through a valve and pneumatic system, indicated generally at 156, to raise or lower the body 134 with respect to the wheels 142.

Therefore, should a situation which indicates the need for emergency braking arise, the pneumatic valve system 156 can be energized to progressively release the air from the bellows 152, thus causing gradual and progressive engagement of the brake shoes 140 with the perimeters of the tires of the wheels 142. Of course, in this particular embodiment of the invention, the restriction provided by the pneumatic valve system 156 constitutes the retarding means whereby gradual engagement of the brake shoes 140 with the perimeters of the tires on the wheels 142 is accomplished.

In substitution for the hydraulic retarding means disclosed hereinabove it is possible to utilize brake shoes such as the brake shoes 30, which are constituted by a plurality of layers of braking material. For instance, a brake shoe constituted by two layers of material may be provided wherein a thin outer layer having a relatively low coefficient of friction may be superimposed upon a thicker layer having a higher coefficient of friction than the outer layer. Therefore, when a brake shoe constructed in this manner initially engages the tire of an associated wheel, the outer layer will be rapidly dissipated and, because of its low coefficient of friction, retard the braking action of the shoe. After the outer layer is dissipated the inner layer with the higher coefficient of friction will come into play and more effective braking action take place.

In substitution for the multiple layer brake shoe, it is possible to impregnate the outer portion of the brake shoe with a lubricating liquid or powder which will momentarily reduce the initial friction between the brake shoe and the tire of the wheel. After the liquid or powder has been dissipated the inherently greater friction of the brake shoe will cause a more effective braking action to be exerted on the tire. By the provision of shoes constructed with built-in retarding means, it is possible to eliminate the necessity for the hydraulic retarding means associated with said brake shoes and disclosed hereinabove.

I claim:

1. In an emergency braking system for a vehicle having a frame supported upon wheels having tires mounted thereupon, the combination of: an emergency brake operatively connected to the frame of said vehicle on each side thereof and juxtaposed to the tires of the adjacent wheels, said emergency brakes being simultaneously movable between an inoperative position in which said brakes are spaced from the perimeters of said tires and an operative position in which said brakes are urged into engagement with the perimeters of said tires; means for maintaining said brakes in said inoperative position and for releasing said brakes for movement into engagement with the perimeters of the respective tires; abutment means mounted on the frame adjacent each emergency brake; and means connected to said brakes for retarding the engagement of said emergency brakes with said tires, said retarding means including piston rod means mounted on each of said brakes adapted to engage said abutment means when said brakes are urged into engagement with said tires to permit gradual braking of said wheels to be accomplished by said brakes.

2. In an emergency braking system for a vehicle incorporating a frame supported upon rubber-tired wheels, the combination of: a pair of emergency brakes, one of which is operatively connected to said frame on opposite sides thereof in juxtaposition to the tire of an adjacent wheel, said brakes being movable between an operative position in which they engage the perimeters of the respective tires and an inoperative position in which they are spaced therefrom, means for maintaining said brakes in said inoperative position and for releasing the same for movement into said operative position; abutment means mounted on the frame adjacent each emergency brake; and means connected to said brakes for retarding the movement of said brakes into progressive engagement with the perimeters of the respective tires, said retarding means including piston rod means mounted on each of said brakes adapted to engage said abutment means when said brakes are urged into engagement with said tires to permit gradual braking of said wheels to be accomplished by said brakes.

3. In an emergency braking system for a vehicle having rubber-tired wheels and a frame supported thereupon, the combination of: a pair of brake shoes pivotally mounted upon opposite sides of the vehicle and operatively connected to the frame thereof for movement between an inoperative position in which said brakes are spaced from the perimeters of said tires and an operative position in which said brakes engage the perimeters of said tires; means for maintaining said brakes in said inoperative position and for releasing the same for movement into said operative position; abutment means mounted on the frame adjacent each emergency brake; and means connected to said brakes for controlling the gradual and progressive engagement of said brakes with the perimeters of the respective tires, said controlling means including piston rod means mounted on each of said brakes adapted to engage said abutment means when said brakes are urged into engagement with said tires to permit gradual braking of said wheels to be accomplished by said brakes.

References Cited in the file of this patent

UNITED STATES PATENTS

| | | |
|---|---|---|
| 469,013 | Des Georges | Feb. 16, 1892 |
| 1,004,733 | Besler | Oct. 3, 1911 |
| 1,151,068 | Van Auken | Aug. 24, 1915 |
| 1,455,576 | Elliott | May 15, 1923 |
| 1,764,602 | Bandla | June 17, 1930 |
| 2,893,520 | Rockwell | July 7, 1959 |
| 2,909,244 | Kraft | Oct. 20, 1959 |